United States Patent Office 3,015,658
Patented Jan. 2, 1962

3,015,658
PROCESS FOR THE PREPARATION OF NEW THEOPHYLLINE DERIVATIVES
Ernst Jucker, Binningen, Baselland, Erwin Rissi, Basel, and Rudolf Süess, Rheinfelden, Switzerland, assignors to Sandoz A.G., Basel, Switzerland, a Swiss firm
No Drawing. Filed Nov. 16, 1959, Ser. No. 852,967
Claims priority, application Switzerland Nov. 21, 1958
6 Claims. (Cl. 260—253)

The present invention relates to novel theophylline compounds and a process for their manufacture. It is an object of the invention to provide novel theophylline derivatives which possess unexpectedly useful pharmacological properties.

It is a further object of the invention to provide a process for the production of these new theophylline derivatives.

Theophylline preparations and theophylline derivatives are widely used for beneficial diuretic, cardiac and muscular action and are generally preferred over such xanthines as caffeine in the treatment of cardiac edema by reason of avoidance of side effects such as insomnia, nervousness, etc. However, due to the slight solubility of theophylline and its known derivatives, the usefulness of this xanthine base, per se, has been quite limited. It has been necessary to use theophylline almost exclusively in the form of soluble double salts, e.g., theophylline and sodium acetate, theophylline and ethylene diamine (aminophylline), etc. (See "New and Non-official Remedies, Council of Pharmacy and Chemistry, A.M.A. (1952), J. P. Lippincott Company, page 294.)

The use of the particular salt selected to achieve solubility represents a disadvantage in administering the drug since the salt has a diluting effect so as to require a larger total dosage to achieve the effectiveness of the pharmacologically active theophylline ingredient which would be derived without such diluent salt.

Increased solubility as in the case of aminophylline, i.e. the ethylene diamine theophylline double compound has led to the achievement of useful peripheral vasodilator action and myocardial stimulation for relief of pulmonary edema or paroxysmal dyspnea of congestive heart failure with this drug. Increased solubility may also be a factor in the recognized usefulness of aminophylline for treatment of paroxysms of bronchial asthma or status asthmaticus, this known theophylline compound being administered by intravenous or intramuscular injection or by inhalation as an aerosol to control immediately dyspnea of cardiac or asthmatic origin.

Despite the important role that theophylline plays in the management of the cardiac patient and the asthmatic patient, the Council on Pharmacy and Chemistry does not accept claims for the efficacy of xanthine therapy, particularly aminophylline in the treatment of coronary thrombosis and angina pectoris. Nevertheless aminophylline is the preparation of choice for administration either orally or by injection in cardiac conditions and orally, rectally, by injection or by inhalation for asthma.

The compounds of the present invention provide novel theophylline derivatives of enhanced water solubility which possess unexpectedly useful pharmacological properties, in particular, a marked histamine, serotonine and acetyl choline inhibiting effect. These pharmacological effects and physical properties are achieved by a new chemical mechanism, entirely different from that of enhanced solubility by ethylene diamine double salt formation as in the case of aminophylline, thus rendering the compounds of the invention useful under circumstances where larger effective dosage based on theophylline content is required and where the histamine and acetyl choline inhibiting effect is needed in therapy.

At room temperature most of the theophylline derivatives, their salts and quaternary compounds of the invention are solid, crystalline substances; they exhibit good water solubility, have a speeding-up action on the heart beat and dilating effect upon the blood vessels. For example in vivo the hydrochloride of 7-β-picolyl-theophylline exerts a broncholytic action approximately equal to that of theophylline, whereas it is 2–4 times as strong as that of dihydroxypropyltheophylline upon serotonin- and pilocarpin-bronchospasmus.

Furthermore, in conjunction with the advantageous and characteristic new antihistamine and acetyl choline inhibiting effect of the specific substances and their derivatives under Formula I below, the toxicity found with mice or test animals of said substances under Formula I and their derivatives is close to that of theophylline. In view of these new and beneficial therapeutic properties of the compounds under Formula I and their salts and quaternary compounds, these compounds are generally useful as medicinal substances; they or their salts or quaternary compounds may be used, in view of their water solubility, as, for example, in ampoule solutions.

As in the case of aminophylline, administration be by inhalation, orally, rectally, intravenously, subcutaneously or intramuscularly.

The invention provides theophylline compounds having the general Formula I,

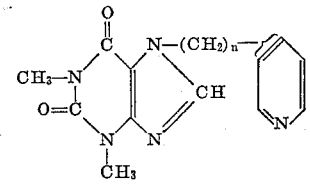

wherein $n$ is an integer from 0 to 5 and their salts and quaternary ammonium.

The present invention also provides a process for the production of the above compounds I, characterized in that theophylline is reacted with a compound having the general Formula II,

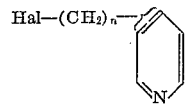

wherein $n$ is an integer from 0 to 5 and Hal is chlorine or bromine; terminal chlorine substituted alkyl pyridines of the above Formula II are readily available. For example, these chlorides may be prepared from the corresponding alkanol pyridines which are prepared in U.S. patent to Cislak, No. 2,789,982. The alkanol pyridines from which the chloride is made in said Patent No. 2,789,-982 may have an alkyl side chain of more than 6 carbon atoms but the products of the invention are restricted to use of these pyridines having no more than 5 carbon atoms in the side chain $(CH_2)_n=5$. When it is desired to produce the corresponding quaternary compound, the said Compound I is treated with a lower alkyl or hydroxyalkyl ester of a pharmaceutically acceptable organic or inorganic acid to produce said quaternary compound, or when it is desired to produce the corresponding salt, the said Compound I is treated with an organic or inorganic acid in manner known per se (the term "known" as used herein designates a method which is in actual use or described in the literature on the subject) to give the said salt.

The acid addition salts of the novel theophylline derivatives of Formula I are generally stable crystalline salts and are prepared by reacting the theophylline compound of Formula I with pharmacologically acceptable inorganic or organic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicyclic acid, glycolic acid, succinic acid, mandelic acid, nicotinic acid, tartaric acid, levulinic acid, stearic acid, myristic acid, palmitic acid, citric acid, isocitric acid, maleic acid, glutaric acid, malic acid, pimelic acid, lactic acid and the like.

The free theophylline base derivative of the invention is also readily converted into quaternary ammonium salts by reacting the base of Formula I with a lower alkyl or lower alkyl derivative of a pharmacologically acceptable organic acid or of a physiologically acceptable inorganic acid. Examples including pharmacologically acceptable anions are methyl bromide, methyl chloride, methyl iodide, dimethyl sulfate, diethyl sulfate, and lower hydroxy alkyl esters of organic or inorganic acids, and the like. The lower hydroxy alkyl esters of pharmacologically acceptable organic and inorganic acids include hydroxy ethyl acetate, ethylene chlorohydrin, propylene chlorohydrin, etc. The word "lower" as applied to hydroxy alkyl esters and alkyl esters of pharmacologically acceptable organic or inorganic acids means that the alkyl or hydroxyl alkyl group in question contains not more than four carbon atoms. Since the pharmacological activity of the theophylline quaternary ammonium salt is due to the cation, any anion of the quaternary ammonium base which is pharmacologically acceptable may be used.

One method of carrying out the process of the invention is effected, for example, by mixing theophylline with a β- or γ-picolyl halide and heating the resulting mixture at an elevated temperature (e.g. 40–250° C.) for some time (e.g., up to 10 hours). The reaction product, after recrystallization from an inert organic solvent, gives rise to a purified 7-β- or 7-γ-picolyl-theophylline.

The compounds of the Formula I may be used especially in the case of cadiac insufficiency, angina pectoris and bronchial asthma.

In the following examples which illustrate the carrying out of the process of the invention but are not intended to be limitative in any way, the temperatures are stated in degrees centigrade.

EXAMPLE 1

7-β-picolyl-theophylline 80.1 g. of theophylline and 66.4 g. of β-picolylchloride hydrochloride are intimately mixed and heated on an oil bath to 220° for 3 hours in an atmosphere of nitrogen, whereby a strong evolution of hydrogen chloride gas occurs. In order to complete the reaction, the mixture is left at the same oil bath temperature for one hour more at the water pump.

After cooling to room temperature, the brown, hard content of the reaction vessel is then crystallized twice from 90% ethanol and gives a good yield of pure 7-β-picolyltheophylline hydrochloride having a melting point of 258–260° (decomposition).

In order to produce the free base, the hydrochloride is dissolved in a little water, the resulting solution is mixed with an excess of 40% sodium hydroxide solution and the freed base is extracted with chloroform. The chloroform extract is dried over sodium sulfate, the solvent is distilled off at 50° at a reduced pressure and the resulting crystalline residue is recrystallized twice from absolute ethanol giving rise to the free base having the melting point of 142.5–144.5°.

EXAMPLE 2

7-[N-(β'-hydroxyethochloride)-β-picolyl]-theophylline 9.0 g. of 7-β-picolyl-theophylline are mixed with 8.02 g. of ethylenechloride (=3 times the theoretical amount) and the resulting mixture is heated in an oil bath for 2 hours to 160°. By repeated crystallization of the crude substance which had been previously cooled to room temperature first from absolute ethanol and then from 95% ethanol, pure 7-[N - (β' - hydroxyethochloride)-β-picolyl]-theophylline is obtained. The pure product has to be dried for several hours in a high vacuum at 85°, otherwise the melting point is indefinite and much lower due to occluded solvent. Melting point (dried) 224–227° (decomposition).

EXAMPLE 3

7-β-picolyl-theophylline-iodomethylate

A solution of 13.55 g. of 7-β-picolyl-theophylline base in 150 cc. of methanol is mixed in one batch with 21.3 g. of methyl iodide (=3 times the theoretical amount) at an oil bath temperature of 40° and the resulting mixture is then kept at 40° for 7 hours. The resulting precipitate is filtered with suction and the filtrate is evaporated at a reduced pressure at 50° to dryness. The remaining residue together with the previously filtered precipitate is recrystallized twice from 98% ethanol. Pure 7-β-picolyl-theophylline-iodomethylate is obtained with a good yield; melting point 252–253° (decomposition).

EXAMPLE 4

7-γ-picolyl-theophylline 80.1 g. of theophylline and 66.4 g. of γ-picolyl-chloride hydrochloride are intimately mixed and heated in an oil bath to 200° for 4 hours in an atmosphere of nitrogen, whereby strong hydrogen chloride evolution occurs. In order to complete the reaction, the mixture is left at the same oil bath temperature for 1 further hour at the water pump.

After cooling to room temperature, the resulting hard content of the reaction vessel is then recrystallized twice from approximately 90% ethanol and gives rise to a good yield of pure 7-γ-picolyl-theophylline hydrochloride having a melting point of 291–293.5° (decomposition).

In order to produce the base, the hydrochloride is dissolved in a little water, an excess of 40% sodium hydroxide solution is added and the free base is extracted with chloroform. The chloroform extract is dried over sodium sulfate, the solvent is distilled off at 50° and reduced pressure and the crystalline residue is recrystallized twice from absolute ethanol in the presence of activated charcoal; melting point 182–184°.

EXAMPLE 5

7-[N-(β'-hydroxyethochloride)-γ-picolyl]-theophylline 27.1 g. of 7-γ-picolyl-theophylline base are thoroughly mixed with 24.15 g. of ethylenechlorhydrin (=3 times the theoretical amount) and the resulting mixture is heated in an oil bath for 3 hours to 150°. By repeated crystallization of the crude substance which had previously been cooled to room temperature, from 90% ethanol, pure 7-[N-(β'-hydroxyethochloride)-γ-picolyl]-theophylline is obtained; melting point 274.5–277.5° (decomposition).

EXAMPLE 6

7-γ-picolyl-theophylline-iodomethylate

A solution of 13.55 g. of 7-γ-picolyl-theophylline base in 150 cc. of methylenechloride is mixed with one batch of 21.3 g. of methyl iodide (=3 times the theoretical amount) at an oil bath temperature of 40° and the resulting mixture is kept at 40° for 7 hours while stirring well. After the reaction has gone to completion, the precipitated material is filtered off and purified by repeated crystallization from methanol and a little water. The pure 7-γ-picolyl-theophylline-iodomethylate is very easily oxidized and melts at 236.5–238.5° (decomposition).

EXAMPLE 7

7-(4'-pyridyl)-theophylline

A mixture of 19.8 g. of theophylline, 10.6 g. of anhydrous sodium carbonate and 11.35 g. of 4-chloropyridine is heated in an oil bath for 6 hours to 170°. The cooled residue is taken up in a mixture of 125 cc. of water, 100 cc. of 2 N sodium hydroxide solution and 300 cc. of chloroform, the resulting insoluble material is filtered off and extraction with 4 portions each of 300 cc. of chloroform is effected. The united extracts are dried over sodium sulfate and then evaporated to dryness at reduced pressure and a temperature of 50°. The remaining crystalline residue, after recrystallization 3 times from dilute ethanol, gives pure 7-(4'-pyridyl)-theophylline having the melting point 263–265°.

EXAMPLE 8

1-(7-theophyllyl)-2-(3'-pyridyl)-ethane hydrochloride

A mixture of 11.9 g. theophylline and 10.7 g. of 3-($\beta$-chloroethyl)-pyridine hydrochloride is heated in an oil bath for 1½ hours at ordinary pressure and for ½ hour at a reduced pressure in an atmosphere of nitrogen at a temperature of 220°. The cooled product is dissolved hereupon in 100 cc. of water and an excess of concentrated sodium hydroxide solution is added. Extraction with several batches of chloroform is effected, the united extracts are dried over sodium sulfate, filtering over activated charcoal is effected and the solvent is evaporated at a reduced pressure and a temperature of 50°. The remaining residue is filtered in chloroform through 200 g. of aluminum oxide and the chloroform eluate is again evaporated to dryness.

In order to convert the non crystalline base into its hydrochloride, the residue is dissolved in ethanol and alcoholic hydrochloric acid is added until the material is acid with Congo indicator. The resulting clear solution is evaporated to dryness at a reduced pressure and a temperature of 50° and the residue is recrystallized 3 times from a mixture of ethanol/acetone. The resulting pure 1-(7-theophyllyl)-2-(3'-pyridyl)-ethane hydrochloride melts at 228–230° (decomposition).

EXAMPLE 9

1-(7-theophyllyl)-3-(4'-pyridyl)-propane hydrochloride

A mixture of 11.15 g. of theophylline and 15.8 g. of 4-($\gamma$-bromopropyl)-pyridine hydrobromide is heated in an oil bath for 3 hours at ordinary pressure and for ½ hour at a reduced pressure in an atmosphere of nitrogen to a temperature of 200°. The cooled product is dissolved in 100 cc. of water and an excess of concentrated sodium hydroxide solution is added. Extraction with several batches of chloroform is effected, the united extracts are dried over sodium sulfate, filtering over activated charcoal is effected and the solvent is evaporated at a reduced pressure and a temperature of 50°. The resulting residue [constituted by 1-(7-theophyllyl)-3-(4'-pyridyl)-propane] is adsorbed on 300 g. of aluminum oxide after dissolving in chloroform and the required product is then eluated with chloroform.

The residue resulting from evaporation of the chloroform eluate is dissolved in ethanol and the resulting solution is mixed with ethanolic hydrochloric acid until the material is acid with Congo indicator. The resulting clear solution is evaporated to dryness in a vacuum and the resulting residue is recrystallized 3 times from ethanol.

The resulting 1-(7-theophyllyl)-3-(4'-pyridyl)-propane hydrochloride, in a pure state, has a melting point of 279–281° (decomposition).

EXAMPLE 10

7-$\beta$-picolyl-theophylline 19.8 g. of theophylline and 25.3 g. of $\beta$-picolyl-bromide hydrobromide are intimately mixed and heated in an oil bath to 220° for 3 hours in an atmosphere of nitrogen, whereby a strong evolution of hydrogen bromide gas occurs. In order to complete the reaction, the mixture is left at the same oil bath temperature for one hour more at the water pump.

In order to produce the free base, the hydrobromide is dissolved in a little water, the resulting solution is mixed with an excess of 40% sodium hydroxide and the freed base is extracted with chloroform. The chloroform extract is dried over sodium sulfate, the solvent is distilled off at 50° at a reduced pressure, and the resulting crystalline residue is recrystallized twice from absolute ethanol giving rise to the free base having a melting point of 142.5–144.5°.

EXAMPLE 11

7-$\gamma$-picolyl-theophylline 19.8 g. of theophylline and 25.3 g. of $\gamma$-picolyl-bromide hydrobromide are intimately mixed and heated in an oil bath to 200° for 4 hours in an atmosphere of nitrogen, whereby strong hydrogen bromide evolution occurs. In order to complete the reaction, the mixture is left at the same oil bath temperature for 1 further hour at the water pump.

In order to produce the base, the hydrobromide is dissolved in a little water, an excess of 40% sodium hydroxide solution is added and the free base is extracted with chloroform. The chloroform extract is dried over sodium sulfate, the solvent is distilled off at 50° and a reduced pressure and the crystalline residue is recrystallized twice from absolute ethanol in the presence of activated charcoal. Melting point 182–184°.

What we claim is:
1. A member of the class consisting of 7-(4'-pyridyl)-theophylline, 7-(3'-pyridyl)-theophylline, 7-$\beta$-picolyl-theophylline, 7-$\gamma$-picolyl-theophylline, their hydrohalides, their lower alkylhalides and their hydroxy lower alkylhalides.
2. 7 - [N - ($\beta'$ - hydroxyethochloride) - $\beta$ - picolyl]-theophylline.
3. 7 - [N - ($\beta'$ - hydroxyethochloride) - $\gamma$ - picolyl]-theophylline.
4. 7-(4'-pyridyl)-theophylline.
5. 7-$\beta$-picolyl-theophylline.
6. 7-$\gamma$-picolyl-theophylline.

References Cited in the file of this patent
UNITED STATES PATENTS
2,887,486    Leake et al. _____ May 19, 1959

OTHER REFERENCES

Shapiro et al.: Jour. Amer. Chem. Soc., vol. 79, pp. 2811–2814 (1957).
Polonovski et al.: Comptes Rendus, vol. 241, pages 215–216 (1955).